United States Patent
Sharp et al.

(10) Patent No.: US 7,083,282 B1
(45) Date of Patent: Aug. 1, 2006

(54) LIGHT RECYCLING COLORED LIGHT SOURCE AND METHOD OF USING

(75) Inventors: Gary D. Sharp, Boulder, CO (US); Jianmin Chen, Superior, CO (US); Michael G. Robinson, Boulder, CO (US)

(73) Assignee: ColorLink, Inc., Boulder, CO (US)

( * ) Notice: Subject to any disclaimer, the term of this patent is extended or adjusted under 35 U.S.C. 154(b) by 380 days.

(21) Appl. No.: 10/370,039

(22) Filed: Feb. 19, 2003

Related U.S. Application Data

(60) Provisional application No. 60/358,517, filed on Feb. 19, 2002.

(51) Int. Cl.
*G03B 21/00* (2006.01)
*G03B 21/14* (2006.01)
*G02F 1/1335* (2006.01)

(52) U.S. Cl. .................... 353/20; 353/31; 353/84; 349/18

(58) Field of Classification Search ............. 353/31, 353/20, 34, 37, 122, 84; 349/5, 18; 348/742
See application file for complete search history.

(56) References Cited

U.S. PATENT DOCUMENTS

| | | | |
|---|---|---|---|
| 6,002,568 A | 12/1999 | Ker et al. | |
| 6,249,410 B1 | 6/2001 | Ker et al. | |
| 6,671,153 B1 | 12/2003 | Ker et al. | |
| 6,674,622 B1 | 1/2004 | Yu et al. | |
| 6,771,325 B1 * | 8/2004 | Dewald et al. | 348/743 |
| 6,827,450 B1 * | 12/2004 | McGettigan et al. | 353/31 |
| 2005/0001995 A1 * | 1/2005 | Dewald et al. | 353/84 |
| 2005/0185148 A1 * | 8/2005 | Davis et al. | 353/84 |

OTHER PUBLICATIONS

Markus Duelli, Tony McGettigan, and Clark Pentico, "Polarization Recovery System Based on Light Pipes", Projection Displays VIII, Proceedings of SPIE, 2002, pp. 9-16, vol. 4657.

Peter Janssen, Jeffrey A. Shimizu, John Dean, Remus Albu, "Design Aspects of a Scrolling Color LCoS Display", Displays, 2002, pp. 99-108, 23.

* cited by examiner

*Primary Examiner*—Christopher Mahoney
(74) *Attorney, Agent, or Firm*—Baker & McKenzie LLP

(57) ABSTRACT

A light source for sequential or scrolling displays that recycles otherwise unusable light. The recycling is achieved by reflecting that portion of the light spectrum that will not be used by a pixel back into the light pipe where the light is rehomogenized or redistributed. The rehomogenized or redistributed light may then be used by other pixels that can uses that portion of the light spectrum. The reflection or transmission of the light through a reflective polarizer is controlled by a polarization rotation element that rotates certain portions of the spectrum according to excitation.

14 Claims, 4 Drawing Sheets

LIGHT RECYCLING COLORED LIGHT SOURCE AND METHOD OF USING

RELATED APPLICATIONS

This application claims priority to U.S. Provisional Application No. 60/358,517, with a filing date of Feb. 19, 2002, which is hereby incorporated by reference herein.

FIELD OF THE INVENTION

The present invention relates generally to a light recycling light source and a method of light recycling, and more particularly to a light recycling light source that provides light to a color sequential or scrolling display device and a method for recycling light from a light source for a color sequential or scrolling display.

BACKGROUND OF THE INVENTION

Sequential or scrolling display devices provide different types of light to a light switching element at either different times or different portions of the light switching element. In color wheel sequential systems, a color wheel filters a light source to alternate between different colors. The filtering results in the unused portions of the spectrum that are wasted. To avoid this waste, a scrolling system that directs different spectrums of light to different portions of a display panel can be used. These scrolling systems include color separation optics, such as dichroic beam splitters and rotating prisms, which are both complex and expensive. Furthermore, the mechanical drives of the color wheels and the rotating prisms may reduce the useful life of the display device and/or may require more frequent maintenance. Accordingly, there is a strong need in the art for a simple, low-cost, light source that has high brightness when used with sequential or scrolling display devices.

SUMMARY OF THE INVENTION

An aspect of the invention is to provide a light distribution system for a light source and a sequential or scrolling display including a reflective light delivery element, a reflective element, and a color selection element between the reflective light delivery element and the reflective element. The color selection element changes a characteristic of light that would be unusable such that the reflective element will reflect the unusable light back into the reflective light delivery element. The reflective light element may be a light pipe having first and second end, the first end of the light pipe being coated with an apertured highly refractive coating and a polarizing reflector adjacent the second end. The reflective light delivery element homogenizes or distributes light traveling through the reflective light delivery system. The light of a first color that travels through the color selection element at a first point undergoes a change in polarization, light of a second color that travels through the color selection element at the first point does not undergo the change in polarization, light of the second color that travels through the color selection element at a second point undergoes the change in polarization and light of a first color that travels through the color selection element at the second point does not undergo the change in polarization Another aspect of the invention is to provide a method for recycling light that is unusable by a sequential or scrolling display including distributing or homogenizing light from a light source, altering a characteristic of distributed or homogenized light according to whether distributed or homogenized light is unusable by a sequential or scrolling display, reflecting light that is unusable by the sequential or scrolling display and redistributing or rehomogenizing the reflected light.

DETAILED DESCRIPTION

The present invention provides improved brightness in color displays by reflecting light that would not be used in certain portions of a panel to a reflective light delivery system. The reflective light delivery system re-homogenizes or redistributes at least some of the light to portions of the panel, which can use that reflected light. This has the effect of recycling of the unused light substantially increases the amount of light utilized and results in enhanced brightness.

Figure 1:
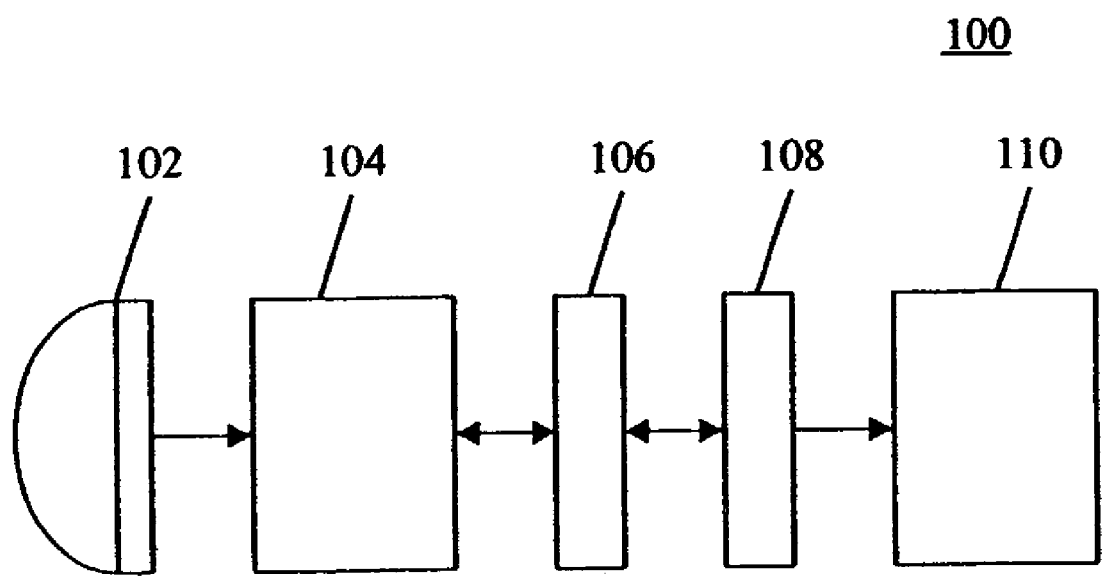
FIG. 1 shows a light recycling light source used with a scrolling display system.

FIG. 1 shows a light recycling light source used with a scrolling display that form a system 100. The system 100 includes a light source, a reflective light delivery element 104, a color selection element 106, a reflective element 108 and a scrolling system 110. The light source 102 generates the light that is transmitted into the reflective light delivery element 104. The reflective light delivery element 104 then distributes or homogenizes the light from the light source 102 before transmission to the color selection element 106. The color selection element 106 changes a characteristic, such as polarization, of the light to enable the system to selectively deliver light of one spectrum to certain pixels of the scrolling system 110 while delivering a light of a different spectrum to other pixels of the scrolling system 110. The system 100 determines which spectrum of light reaches which pixels by including a reflective element 108 that transmits or reflects light according to the characteristic changed by the color selection element 106. The color selection element 106 changes the characteristic (e.g., polarization) of the light received from the reflective light delivery system, such that part of the light will be transmitted through the reflective element 108 for delivery to the scrolling system 110. The remainder of the light is reflected by the reflective element 108 back through the color selection element 106 and into the reflective light delivery element 104. The reflective light delivery element 104 then causes the light to be re-homogenized or redistributed and then returned to the color selection element 106. At least some of the light will be delivered to different points and will include some pixels that use that spectrum of light. This re-homogenized or redistributed light can pass through the reflective element 108 into the scrolling system 110. This has the effect of recycling the unused light into usable light thereby increasing the level of brightness of the system 100.

Figure 2:
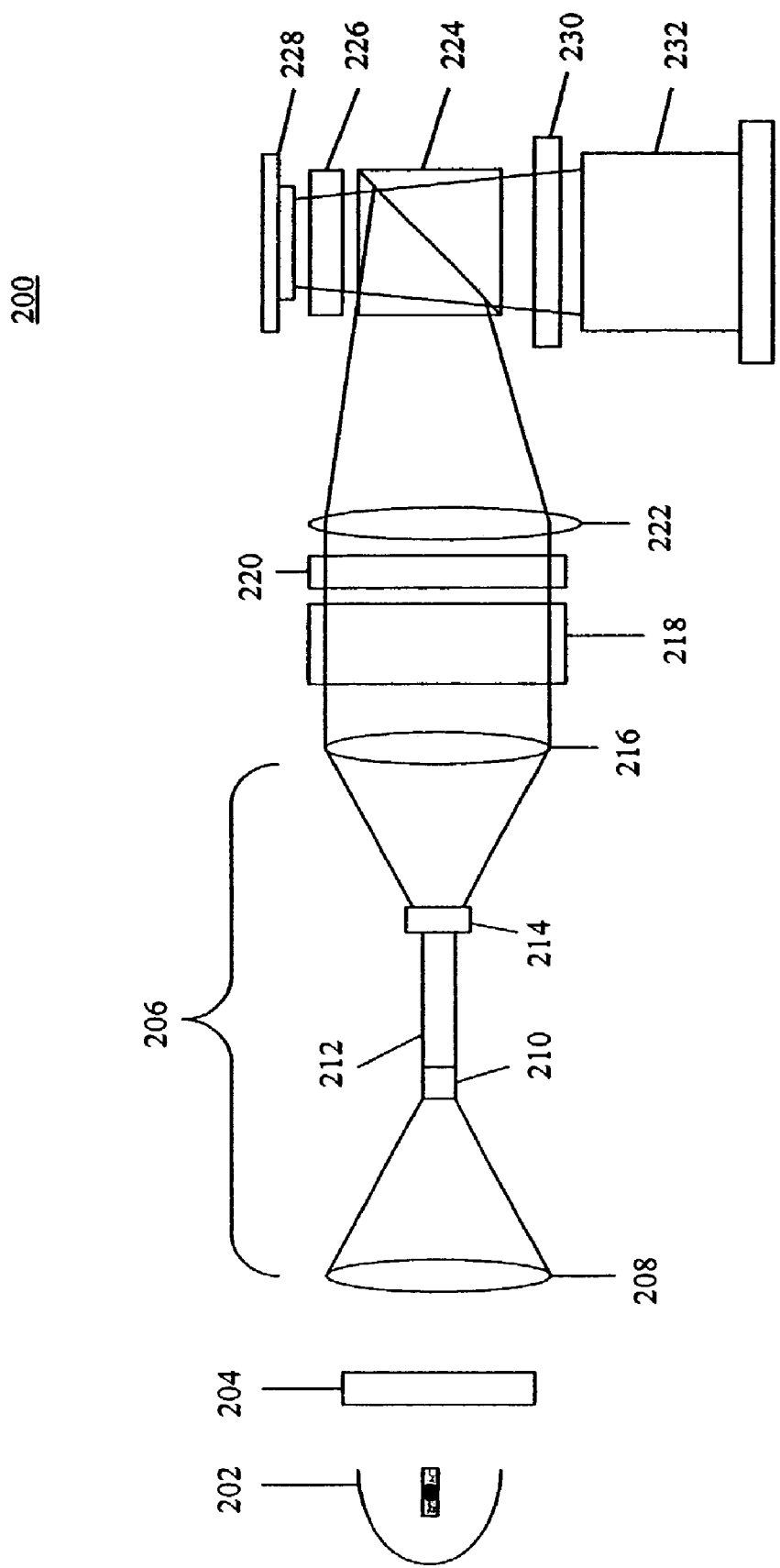
FIG. 2 shows a one-panel system according to an exemplary embodiment of the present invention.

FIG. 2 shows a one-panel system 200 according to an exemplary embodiment of the present invention. The system 200 includes a light source 202, such as a ultra high pressure (UHP) lamp, that generates light which is then filtered by an ultraviolet/infrared filter 204 before being input into a light delivery subsystem 206. The light delivery subsystem 206 includes an initial focusing lens 208 that focuses the light received from the light source 202 onto an aperture of an apertured reflector 210 located at one end of a light pipe 212. The apertured reflector 210 is highly reflective and can be made of a metal, a multi-layered dielectric or any other highly reflective material or structure. The apertured reflector may also include polarization changing elements. The light pipe 212 can be a prism, such as a glass rectangular prism. Alternative, the prism can be any suitable material or any suitable shape.

The light entering the light pipe 212 from the apertured reflector 210 travels through the light pipe 212 and becomes homogenized or distributed. The light then is incident upon a reflective polarizer 214. The reflected polarizer 214 could be a wire grid such as produced by Moxtek (Salt Lake City, Utah), a cholesteric reflector or any other suitable reflective polarizing element. The light transmitted from the reflective polarizer 214 is then incident upon an output lens 216 of the light delivery subsystem 206. The output lens 216 collimates the polarized light for incidence upon a color switch 218. The color switch 218 alters the polarization of the light such that one part of the spectrum has a polarization different from another part of the spectrum. The color altered will be different in different parts of the color switch. For example, the upper half of the color switch could pass one color while the lower half passes a different color, alternatively different lines of the color switch could pass different colors, or alternatively different pixels could pass different colors. A conventional progressive scan active matrix LCD is written from top to bottom and therefore requires that the colors be scrolled. However, a color switch allows any color to illuminate a portion of the LCD at any instant. It may be preferable to write data to the panel in a different sequence, perhaps for higher brightness or reduced color artifacts.

Other configurations are also possible provided the color switch 218 allows the recycling of light from a pixel which does not use that color of light to another pixel which does use that color of light. The light having traveled through the color switch now has different polarization states. Thus, light incident upon a reflective polarizer 220 will transmit light of one polarization (e.g., vertical) and will reflect light of orthogonal polarization (e.g., horizontal). The light reflected by the reflective polarizer 220 travels back through the color switch 218, the output lens 216 and reflective polarizer 214 to the light pipe 212. The light pipe 212 and the apertured reflector 210 rehomogenize or redistribute and return the light back through the reflective polarizer 214. This recycles a portion of the light spectrum otherwise unusable from the pixels that cannot use that portion of the light spectrum to pixels that can use light of that portion of the light spectrum.

The polarized light emitted from the reflective polarizer 220 is focused by a lens 222 onto a polarizing beam splitter (PBS) 224. The PBS 224 reflects the polarized light through a quarter wave plate 226 onto a reflective panel 228. The reflective panel 228 selectively reflects light that will be used for display. The reflective panel 228 can be any kind of reflective display panel such as a liquid crystal on silicon panel or any other suitable panel. The light that is reflected from the panel 228 passes though the quarter wave plate 226 and the PBS 224 to a clean-up polarizer 230 and is projected by projection optics 232.

Figure 3:
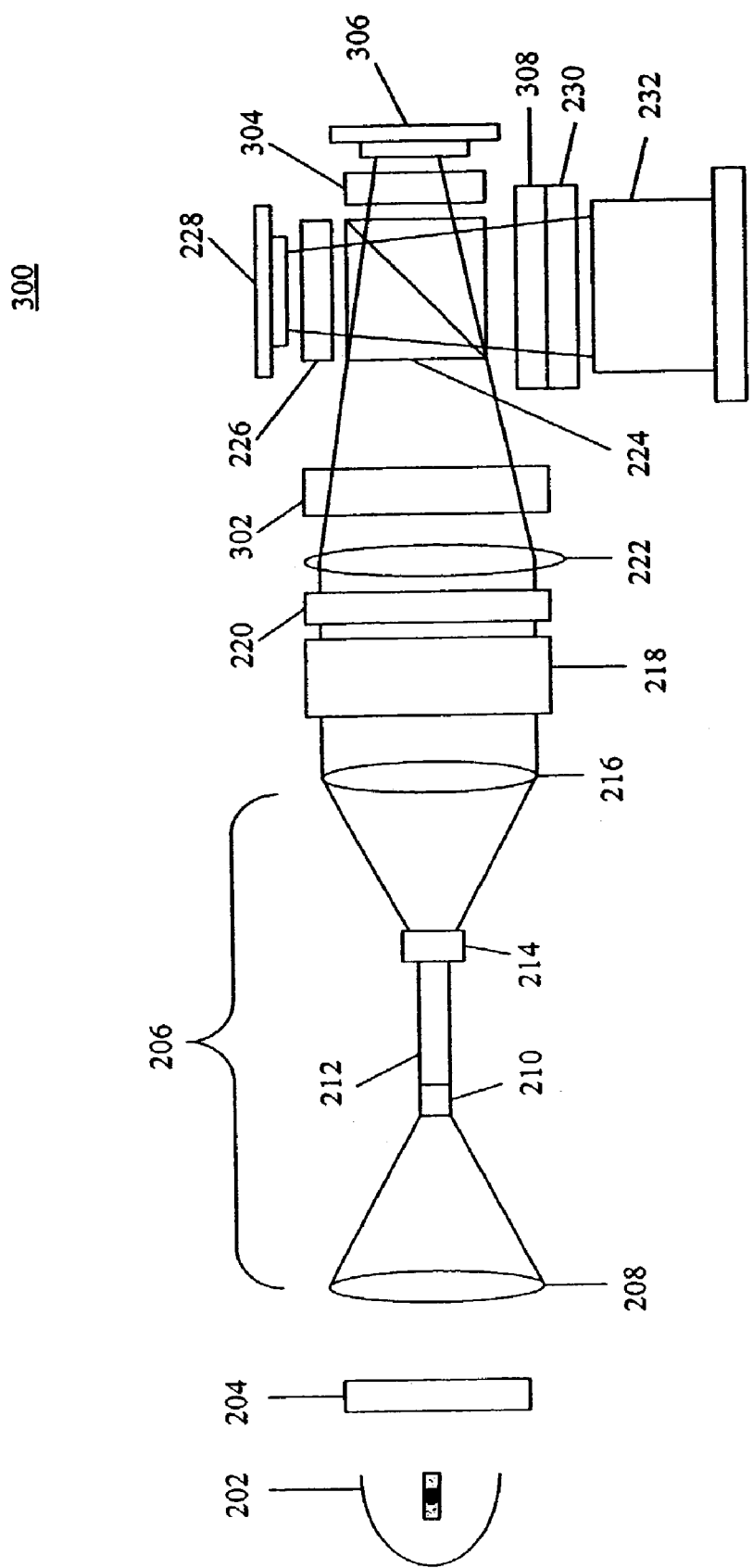
FIG. 3 shows a two-panel system according to an exemplary embodiment of the present invention.

FIG. 3 shows a two-panel system according to an exemplary embodiment of the present invention. FIG. 3 is a two-panel version of FIG. 2 and has similar operation and components.

FIG. 3 further includes a color selection filter 302 that rotates the polarization of one color of light such that this light is transmitted through the PBS 224 instead of being reflected. The light rotated by the color selection filter 302 is then incident upon a quarter wave plate 304 and a second panel 306. The second panel 306 selectively reflects light that will be used for display through the quarter wave plate 304 to the PBS 224. The light from the second panel 306 is reflected by PBS 224 onto an output color selection filter 308 that rotates the polarization such that all of the light has a common polarization direction with clean-up polarizer 230.

Figure 4:
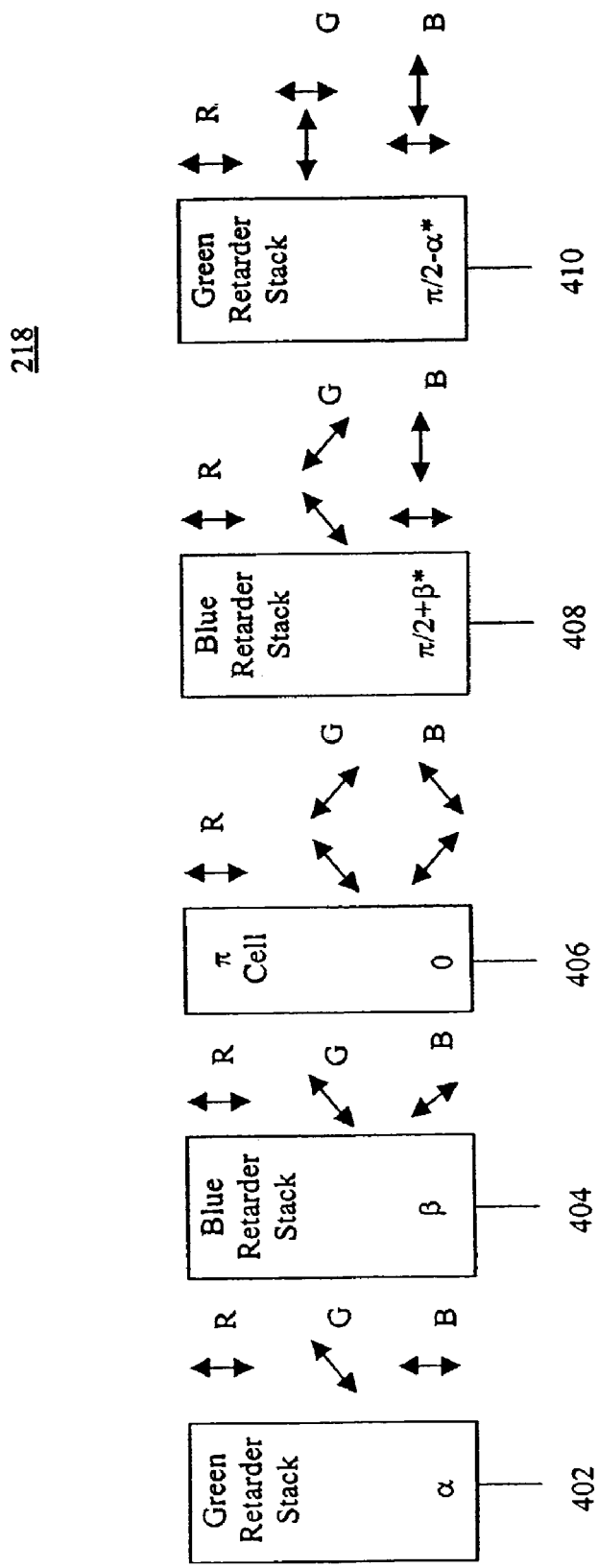
FIG. 4 shows an exemplary embodiment of a color switch.

FIG. 4 is an exemplary embodiment of a color switch 218. The light incident upon the color switch 218 is vertically polarized light. This vertically polarized light is then rotated by the green retarder stack 402 such that the red and blue components have a common polarization direction (e.g., vertical) and the green components have a different polarization direction (e.g., at an angle between the vertically and horizontally directions). Next a blue retarder stack 404 rotates the blue component of light from a common polarization direction (e.g., vertical) to a different polarization direction (e.g., at an angle between the vertically and horizontally directions which may the same or a different polarization direction as the green light). The light is then incident upon a π cell 406 that can be selectively energized to any desired pattern. The energized or "on" state will rotate the polarization of the green and blue light by 90° while the non-energized or "off" state will leave the polarization state substantially unchanged. The polarization of red light is not changed by the π cell 406. The light from the π cell 406 is then incident upon a blue retarder stack 408 which completes the transformation of the polarization state of the blue light to one of horizontal or vertical polarization, depending upon the excitation state of the π cell 406. The light from the blue retarder stack 408 is then incident upon a green retarder stack 410 which completes the transformation of the polarization state of the green light to one of horizontal or vertical polarization, depending upon the excitation state of the π cell 406. In effect, the color switch 218 simply rotates the polarization of one color of light while leaving the remaining colors of light unchanged.

The vector retarder angle for the green retarder stack 402 is $\alpha$, the vector retarder angles for the blue retarder stack 404 is $\beta$, the vector retarder angle for the second blue retarder stack 408 is $\pi/2+\beta^*$ and the vector retarder angles for the second green retarder stack 410 is $\pi/2-\alpha^*$, where $\alpha^*$ is vector of retarder angles for the green manipulating stack 402 but with reverse order and $\beta^*$ is the vector of retarder angles for blue manipulating stack 404 with reverse order. A more complete description of color switches can be found in U.S. Pat. No. 6,273,571, which is incorporated herein by reference in its entirety.

A single stage with interleaved stacks such as shown in FIG. 4 can operate with intermediate polarization states as shown, however, these specific polarizations are not required. For example, any elliptical state with 45-degree orientation could be used instead of the illustrated exemplary embodiment of a retarder stack that produces a 45-degree linear intermediate polarization. Moreover, blue and green bands need not have orthogonal polarizations. Any normally filtered stack pair used in conjunction with a normally white stack pair may be used to provide both a magenta state and yellow state. Alternatively, one cell could be used to modulate blue and another to modulate green so as to function as a two-bit color switch.

Another consideration relates to chrominance of the π cell in covering the entire blue/green band in the half-wave state. A π cell may not provide achromatic response in the low-voltage state, giving some degradation in performance. Where this is a problem, some interaction between the blue and green stages can be done to offset the chromatic response of the cell in the half-wave state so as to provide near ideal spectra. Where chromatic effects are a problem, it is often more advantageous to avoid green light leakage that contaminates the magenta state as blue leak in the green state is more tolerable. As such, one advantageous embodiment is where magenta is generated in the driven (zero-retardance) state.

The reflective light delivery element can be any kind of device that couples light from a light source into an element that will homogenize or distribute the light for incidence upon a reflective polarizer. An exemplary reflective light delivery element is a light pipe of this kind was presented by Optical Coating Laboratories at Photonics West '02 on Jan. 20–25, 2002. Alternatively, the light pipe may include polarization conversion elements, either on the end faces, or coated on the light pipe body can be used such that light reflected by the apertured reflector 210 returns light that is substantially orthogonally polarized. The reflective light delivery element may also include other elements such as a waveplate.

The present invention may be used where the color of light that is used by some of the pixels is different from the color of light that is used by other of the pixels. The color used by a particular pixel may be fixed or changing. The panel as a whole may include pixels that only use light of a fixed color, that only use light that changes color or that use light of fixed color in some pixels and changing color in other pixels.

The exemplary embodiments of the present invention illustrate reflective one and two panel displays. The present invention may be used with display having three, four or more panels. Alternatively, the present invention may be used with transmissive instead of reflective displays. Alternatively, the present invention may use any kind of optical display panel that modulates light. Increased brightness, reduced color artifacts, reduced non-uniformity (e.g., due to progressive-scan addressing) by etching scrapes in the cell ITO pass regions can be individually addressed.

In this subtractive mode the polarizers are parallel such that the green output is generated by the blue modulating stage and the blue output is generated by the green modulating stage. The parallel polarizer design eliminates need for a red color selection filter. Alternatively, only magenta and yellow states need to be generated if the filter need not generate a black state. Filters that need not generate a black state include a normally white display driven locally (e.g., line-by-line) or a display that can be rapidly and globally driven to a black state. A single display should be able to provide the requisite 1 bit switching, thereby making it convenient to image a striped color switch, spatial and modulated in a single plain onto the display.

Although several embodiments of the present invention and its advantages have been described in detail, it should be understood that changes, substitutions, transformations, modifications, variations, permutations and alterations may be made therein without departing from the teachings of the present invention.

The invention claimed is:

1. A light distribution system for a light source and a sequential or scrolling display, wherein light within the system comprises at least a first and a second color component, the system including:
   (a) a first light directing element;
   (b) a second light directing element; and
   (c) a color selection element between the first light directing element and the second light directing element, wherein the color selection element is operable to selectively change a characteristic of one of the first and second color components, whereby one color component will be passed on to the display and the other color component will be preserved within the light distribution system, wherein the first and second color components are temporally switched between being the display component and being the preserved component, wherein polarization is the changed characteristic.

2. A light distribution system in accordance with claim 1 wherein the component having the changed characteristic is the display component.

3. A light distribution system in accordance with claim 2 wherein the preserved component is usable by the sequential or scrolling display when the characteristic of the display component is changed relative to that of the preserved component.

4. A light distribution system in accordance with claim 1 wherein the component having the changed characteristic is the preserved component.

5. A light distribution system in accordance with claim 4 wherein the preserved component is usable by the display when the characteristic of the preserved component is changed relative to that of the display component.

6. A light distribution system in accordance with claim 1 wherein the first light directing element is operable to homogenize light from a light source within the light distribution system.

7. A light distribution system in accordance with claim 1 wherein the second light directing element directs the preserved component and the display component to respectively remain within the distribution system or be passed on to the display depending upon the changed characteristic difference of one of the components.

8. A light distribution system for a light source and a sequential or scrolling display, wherein light within the system comprises at least a first and a second color component, the system including:
   (a) a first light directing element;
   (b) a second light directing element; and
   (c) a color selection element between the first light directing element and the second light directing element, wherein the color selection element is operable to selectively change a characteristic of one of the first and second color components, whereby one color component will be passed on to the display and the other color component will be preserved within the light distribution system, wherein the first and second color components are temporally switched between being the display component and being the preserved component, wherein the component having the changed characteristic is the display component.

9. A light distribution system in accordance with claim 8 wherein polarization is the changed characteristic.

10. A light distribution system in accordance with claim 8 wherein the preserved component is usable by the sequential or scrolling display when the characteristic of the display component is changed relative to that of the preserved component.

11. A light distribution system in accordance with claim 8 wherein the component having the changed characteristic is the preserved component.

12. A light distribution system in accordance with claim 11 wherein the preserved component is usable by the display when the characteristic of the preserved component is changed relative to that of the display component.

13. A light distribution system in accordance with claim 8 wherein the first light directing element is operable to homogenize light from a light source within the light distribution system.

14. A light distribution system in accordance with claim 8 wherein the second light directing element directs the preserved component and the display component to respectively remain within the distribution system or be passed on to the display depending upon the changed characteristic difference of one of the components.

* * * * *